March 13, 1928. 1,662,324
W. OBER ET AL
HOISTING APPARATUS
Filed Nov. 10, 1926
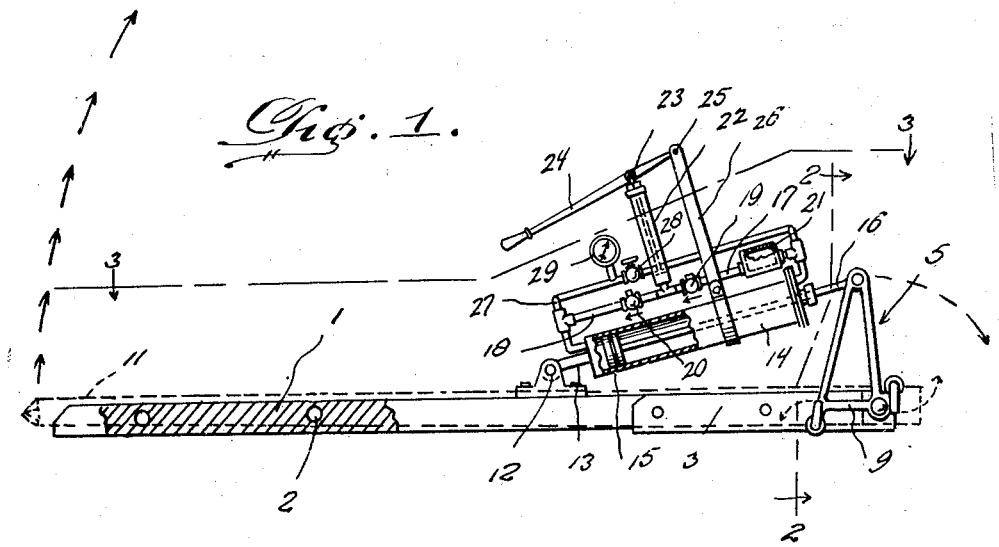
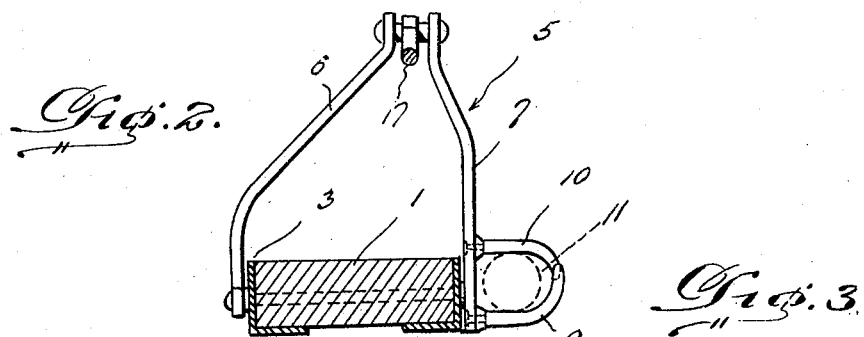
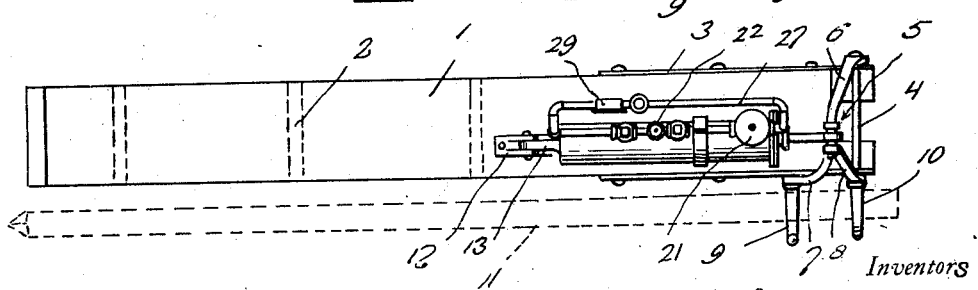
Inventors
William Ober,
Clemens T. Eakins,
By Clarence A. O'Brien
Attorney Patented Mar. 13, 1928.

1,662,324

UNITED STATES PATENT OFFICE.

WILLIAM OBER AND CLEMENS F. EAKINS, OF BRUSH, COLORADO.

HOISTING APPARATUS.

Application filed November 10, 1926. Serial No. 147,493.

This invention relates to an improved apparatus which is especially, but not necessarily, adapted for hoisting and setting in position telephone and telegraph poles.

Briefly, the invention has reference to a structure of this kind which includes a base adapted to be securely anchored to the ground adjacent the hole, means being supported on this base for grasping and raising the pole from a horizontal position to a vertical position, wherein it is allowed to drop by gravity, into the hole.

Our principal aim is to provide a practical and durable, and sturdy apparatus of this kind which is highly efficient in operation and which may be manipulated by hand power without requiring undue physical exertion on the part of the operator.

Other features and advantages of the invention will become apparent from the following description and drawings.

In the drawings:—

Figure 1 is a side view with portions broken away and shown in section of the complete structure, showing it ready to lift the pole upwardly.

Fig. 2 is a transverse section on an enlarged scale taken approximately upon the plane of the line 2—2 of Fig. 1.

Fig. 3 is also a section which is taken on the line 3—3 of Fig. 1.

Referring to the drawings in detail, it will be seen that the reference character 1 designates the base which is in the form of an elongated plate having holes 2 located at suitable intervals for reception of pike poles providing means for workmen to maintain the base in a horizontal position on the ground. In practice, it may be preferable to provide wheels for supporting the base, so that it may be moved readily from place to place to facilitate setting of the poles.

At the right hand end of the base, is a metal channel 3 which has one end portion extending beyond the right hand end of the base plate as shown better in Fig. 3. Mounted in the flanges of the extending portions is a transverse oscillatory axle 4 with which a bail 5 is connected for rocking movement. This bail embodies a single arm 6 on one side and a pair of downwardly diverging arms 7 and 8 on the opposite side, these being connected together as at 8' and the arm 8 being connected with the aforesaid axle 4.

Carried by the free end of the arm 7 is an upwardly opening pole supporting hook 9 and carried by the other arm is a downwardly directed hook 10. These hooks are arranged in opposed spaced relation in a manner to engage opposite sides of the telephone pole as shown in dotted lines at 11 in Fig. 3.

Secured to the upper side of the base is a bracket 12 with which a stem 13 on a cylinder 14 is pivotally mounted. This cylinder is adapted to accommodate a reciprocatory piston 15 which is operated under the action of fluid, preferably oil. The stem 16 is connected with the bail to rock it in the direction of the arrow when the piston 15 is operated in a direction from left to right.

A system of pipes is mounted upon the cylinder for circulation of the oil. The pipes embody branches 17 and 18 in which valves 19 and 20 are arranged. 21 represents a vent chamber and 22 a small hand pump cylinder which is connected with these branch pipes at a point between the two valves. These are check valves which open in one direction only.

There is of course a piston located in the cylinder 22, the same being indicated at 23 and being operated by a hand lever 24 pivotally connected at 25 to the upper end of a standard 26 carried by a clamp which is in turn carried by the aforesaid cylinder 14. A return pipe 27 is provided with a valve 28 and a pressure gauge 29, this being connected with the branch pipes which are in turn connected with the opposite ends of the aforesaid cylinder 14. In connection with this petcock or valve 28, it is to be stated that it is opened to allow the liquid in the cylinder to pass to the front end of the cylinder as the piston is receding to the left hand end. This therefore provides a convenient means to get the piston back to starting point and ready to raise another pole.

In practice it is obvious that the base of the telegraph pole is engaged with the opposed spaced hooks 9 and 10 in a manner as indicated in Fig. 1. The base 1 may be staked to the ground, so that it will not slip in the operation of the hoisting device. It will be noticed in this connection that the base is provided with horizontal holes for reception of pike poles to aid in preventing tilting of the base. Assuming that the oil is located in the right hand end of the cylinder 14 with the parts arranged as represented in Fig. 1, it will be seen that by operating the hand pump, the oil will be circulated by suction and pressure to enter the left hand end of the cylinder 14 and to drive the piston 15 in a direction from left to right. In so doing, the stem 16 will move the bail 5 in the direction of the arrow, thus rocking the shaft 4 and lifting upwardly on the pole.

During this movement of parts, the end of the cylinder pivoted at 12 will allow the stem 16 at the opposite end to move downwardly toward the base. Obviously, when the telegraph pole assumes a perpendicular position, it will drop by gravity into the hole which has been previously dug in the ground for its reception. A very small leverage will serve to lift the pole with the least exertion imaginable.

It is believed that by considering the description in connection with the drawings, a clear understanding of the invention will be had. Therefore, a more lengthy description is thought unnecessary.

Having thus described our invention, what we claim as new is:—

1. In a hoisting device of the class described, a pole hoist supporting base adapted to be retained on the ground adjacent a hole which has been previously dug in the ground for reception of the pole, a pair of longitudinally spaced hooks adapted to engage the base end of said pole at its upper and lower surfaces respectively, said hooks being rotatable about a common axis, means for mounting said hooks upon said supporting base and operating means for said hooks carried on said supporting base.

2. In a hoisting device of the class described, a pole hoist supporting base adapted to be retained on the ground adjacent a hole which has been previously dug in the ground for reception of the pole, a plurality of pole embracing devices adapted to engage the base end of said pole, in clamping relation upon the upper and lower surfaces thereof, said devices being connected for uniform swinging movement about a common axis, means for mounting said pole embracing device upon the said supporting base and operating means therefor carried on said base.

3. In a pole hoisting device of the class described, a base plate, a bail rockably mounted on one end of the plate, pole hooks carried by said bail and swingable about a common horizontal axis in pole engaging position at the upper and lower surfaces thereof and means mounted on said base and operatively connected with said bail for operating the same so as to simultaneously move the hooks into successively swung position.

4. In a pole hoisting device of the class described, a base plate, a bail rockably mounted upon said plate, pole gripping hooks carried by said bail and mounted for swinging on a common horizontal axis and opening oppositely for engaging the upper and lower surfaces of the pole, a pivotally mounted cylinder on said base, a piston reciprocable in said cylinder and including a stem connected with said bail for rocking the latter, and operating means for said piston.

5. In a hydraulic pole hoisting apparatus, a pole hoist supporting base adapted to be retained on the ground adjacent a hole which has been previously dug in the ground for reception of the lower end of the pole, a bail rockably mounted upon one end of said base, hooks extending laterally of said bail and adapted to engage the lower end portion of said pole at different longitudinal positions, one of said hooks opening upwardly and the other opening downwardly whereby to engage the opposite surfaces of the pole and arranged for rotating movement about a common axis, a fluid cylinder pivotally mounted upon said base, a piston slidable in said cylinder and including a stem connected to said bail, valved fluid circulating pipes connected with the end portions of said cylinder, and a hand pump connected with and circulating the fluid.

In testimony whereof we affix our signatures.

WILLIAM OBER.
CLEMENS F. EAKINS.